United States Patent Office 3,548,223
Patented Dec. 15, 1970

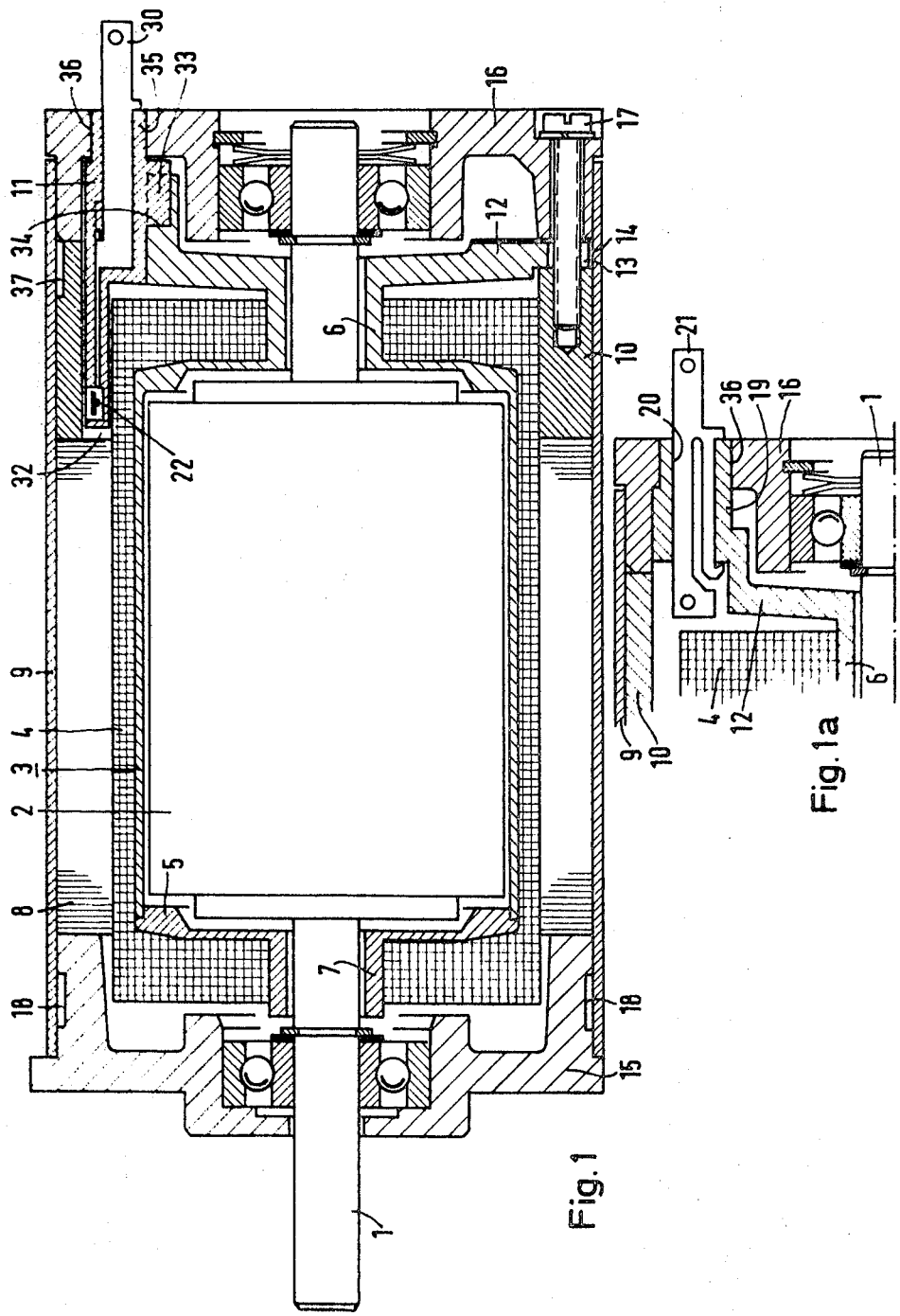

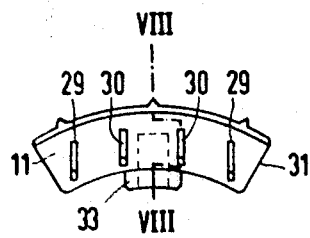
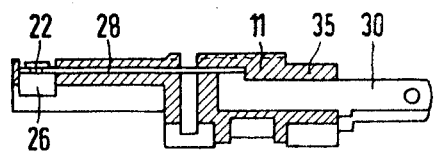
Fig. 7
Fig. 8
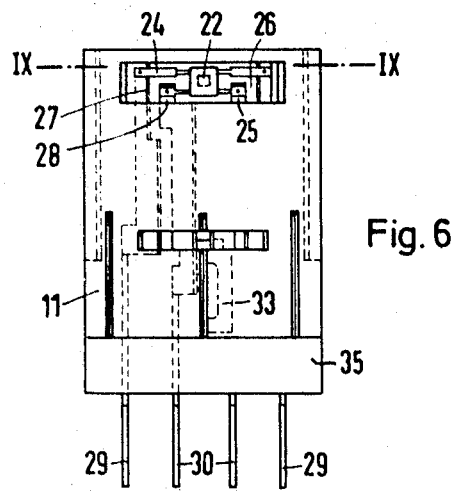
Fig. 6
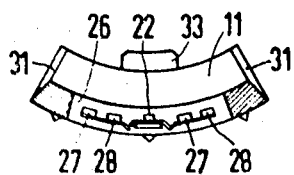
Fig. 9

3,548,223
BRUSHLESS DIRECT-CURRENT MOTOR WITH GALVANOMAGNETIC CONTROL MEMBERS
Werner Dittrich and Reiner Kristen, Nuremberg, Germany, assignors to Siemens Aktiengesellschaft, Munich, Germany, a corporation of Germany
Filed Apr. 7, 1969, Ser. No. 814,014
Claims priority, application Germany, Mar. 7, 1969, 1,911,579
Int. Cl. H02k
U.S. Cl. 310—10
8 Claims

ABSTRACT OF THE DISCLOSURE

A brushless direct-current motor, preferably of the midget type, which is commutated under control by Hall probes or the like galvanomagnetic control members acted upon by the magnetic field of a permanent-magnet rotor, has a stator composed of a coil support on which the stator windings are mounted and an annular laminated stator yoke surrounding the windings. The stator is enclosed in a tubular housing, and the galvanomagnetic probes are mounted on carriers which are inserted into one axial end of the housing. Thus inserted, the galvanomagnetic-probe carriers engage respective recesses of a magnetizable ring coaxially adjacent to the yoke. A bearing shield for journalling the rotor shaft is located beside the ring and in engagement with the probe carrier to positively secure the probes in fixed positions relative to the stator.

SPECIFICATION

Our invention relates to a brushless direct-current motor with galvanomagnetic commutation control, preferably a motor of the midget type. The rotor of the motor is constituted essentially by a permanent magnet fastened on the motor shaft. The stator assembly of the motor comprises a drum-shaped coil carrier which coaxially surrounds the rotor and carries the stator windings. The magnetic yoke portion of the stator surrounds the windings and is constituted preferably by a stack of annular laminations. The terminals of the motor are mounted on a carrier which is concentrically located at one axial side of the rotor and also carries the galvanomagnetic probes.

In a known brushless direct-current motor of this general type, the stator winding is composed of four star-connected winding portions whose free ends are electrically connected to one pole of direct-voltage supply means through the collector-emitter paths of four transistors respectively, whereas the star point common to the four winding portions is connected to the other pole. Each two of the transistors are controlled by a Hall probe. The two probes are displaced 90° spatially relative to the appertaining winding portions. The two Hall-voltage terminals of each probe are connected with the respective bases of the two appertaining transistors. Since in the known motor the Hall probes are traversed by the field of the permanent-magnet rotor, they are arranged within respective recesses along the inner peripheral surface of the magnetic yoke of the stator.

A more detailed description of the just-mentioned known motor and its circuitry is presented in the copending application Ser. No. 634,212, filed Apr. 27, 1967, by Julius Brunner and Erich Rainer, for Brushless Direct-Current Motor With Hall Generator Control. It should be understood, however, that the invention analogously applies to direct-current motors in which the galvanomagnetic members for commutation control are constituted by other galvanomagnetic devices such as magnetic-field responsive resistors (also called field plates) or galvanomagnetic diodes. Direct-current motors with such two-terminal galvanomagnetic devices and corresponding circuitry are described and illustrated in the copending application Ser. No. 782,902, filed Dec. 11, 1968, by Jurgen Wenk, for Commutating Circuit for a Commutatorless D-C Miniature Motor.

It is an object of our invention to improve brushless direct-current motors of the above-mentioned type so as to facilitate assembling the motor components.

Another, conjoint object of the invention is to afford the possibility of readily removing or exchanging the galvanomagnetic commutation control members, such as Hall probes, without the necessity of performing soldering work for this purpose.

To achieve these objects, and in accordance with a feature of our invention, the galvanomagnetic members are firmly affixed, preferably fusion bonded to respective carriers which also carry electric connector members, preferably designed as a plug pin as well as a lug for attachment of the stator windings. The carriers, thus equipped, are in engagement with recesses of a magnetizable ring which forms part of the yoke assembly of the motor, the engagement being such that the galvanomagnetic members are located near the ring in order to be traversed by magnetic flux issuing from the rotor and passing through the ring. Furthermore, a bearing shield situated in coaxial relation to the magnetizable ring and having means for journalling the rotor shaft, is also in engagement with the carriers so as to positively secure them in fixed positions as long as the bearing shield remains attached to the stator, whereas the probe-carrying parts with their connector members can be disengaged from the recesses of the yoke ring and taken out of the motor when the bearing shield is removed.

According to another and preferred feature of our invention, we provide the drum or spool-shaped coil support of the stator with a flange which forms an integral structure with the support and is equipped with mounting legs as well as with a plug bar for the insertion of connecting lugs which, when stuck into and thereby latched together with the bars, provide connecting terminals for the stator winding. The radial legs are anchored in front-side recesses of the ferromagnetic ring and serve for taking up the reaction moment (recoil torque) of the motor as well as for holding the coil support and stator winding assembled in the correct position relative to the galvanomagnetic probes.

While we preferably employ Hall probes as galvanomagnetic control members and hereinafter describe the invention mainly with reference to such probes, it will be understood that the above-mentioned other types of galvanomagnetic control components may be used instead.

Details and further features of our invention will be apparent from the following description of an embodiment illustrated by way of example on the accompanying drawings, in which:

FIG. 1 is a longitudinal section through the motor;
FIG. 1a shows in section a detail of the same motor;
FIG. 2 is a plan view onto the terminal side of the motor, the bearing shield being removed;
FIG. 3 is a section through the coil support along the line III—III in FIG. 2;
FIG. 4 is a sectional view of the coil support, the section being along the line IV—IV in FIG. 3;
FIG. 5a shows the ferromagnetic yoke of the motor seen from the right of FIG. 5b; FIG. 5b is a section along the line Vb—Vb of FIG. 5a; and FIG. 5c is a view of the same ring seen from the left of FIG. 5b;
FIG. 6 is a front view of the carrier structure and of one of the supporting parts on which one of the Hall probes is mounted;
FIG. 7 is a lateral view of the same carrier structure seen from the bottom side of FIG. 5;

FIG. 8 is a section along the line VIII—VIII in FIG. 7; and

FIG. 9 is a section along the line IX—IX in FIG. 6.

Figure 3:
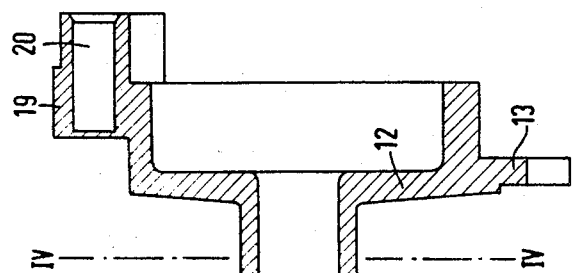
Figure 4:
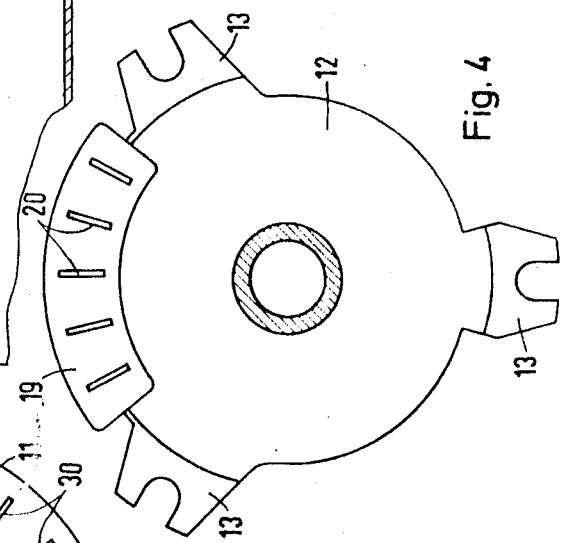

The illustrated miniature motor comprises a rotor shaft 1 on which a permanent-magnet body 2 constituting the rotor is fixedly mounted. The rotor is a cylindrical body which is diametrically magnetized so as to have a single pair of north and south poles. The rotor 2 is surrounded by a coil carrier 3 of non-magnetic material such as synthetic plastic, although it may also consist of non-magnetic metal such as aluminum or brass. The coil support 3 carries a four-part stator winding 4, arranged in two pairs, which number of pairs corresponds to the two poles of the rotor. If desired, more than one pole pair may be provided on the rotor, in which case correspondingly more than two pairs of winding portions are needed. The circuitry required for energizing and commutating the stator windings is not further illustrated and described herein because it may be identical with the circuitry illustrated and described in the above-mentioned copending application, Ser. No. 634,212. If galvanomagnetic two-terminal devices are used instead of Hall probes, the correspondingly modified circuitry may be as illustrated and described in the above-mentioned application Ser. No. 782,902.

Figure 2:
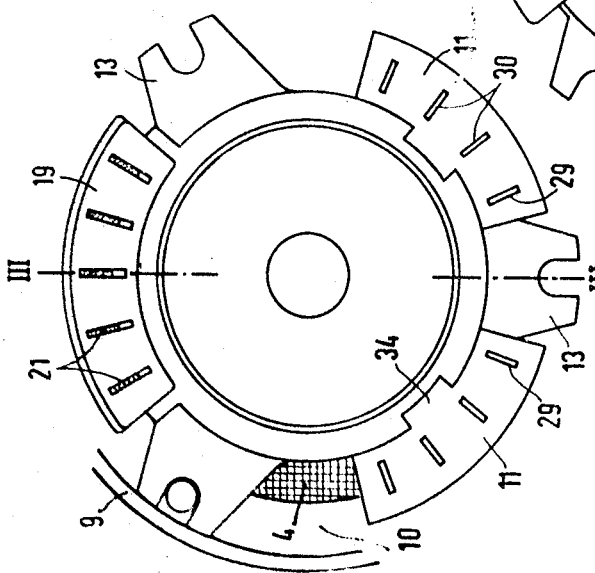

In order to permit inserting the permanent type magnet rotor 2 into the bell-shaped winding support 3, the support is provided with a separate cover 5. The bell-shaped main structure of the coil support 3 and the cover 5 are integrally joined with respective tubular extensions 6 and 7 which extend concentrically about and along the shaft 1 and which are traversed by the shaft. The stator winding 4 is coaxially surrounded by a magnetic yoke structure 8 formed of punched laminations of annular shape and held together by a housing or metal can 9. The can 9 consists of material, such as sheet steel, which can be shaped by such metal-forming operations as the magnetic pulse-forming method. A ferromagnetic ring 10 (FIGS. 1 and 5a–c) adjacent the laminated yoke 8 forms part of the entire yoke assembly and also serves to hold two Hall-probe carriers 11 (FIGS. 1, 2 and 6) in a positively fixed position, as will be more fully described hereinafter.

Figure 5A:
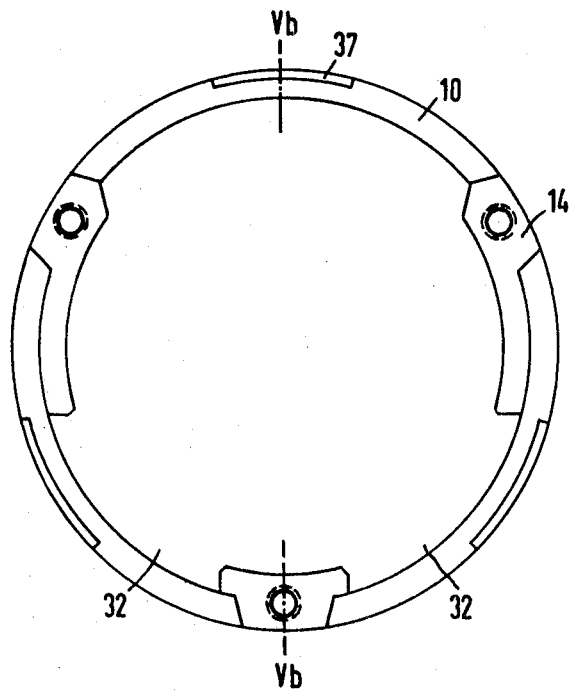
Figure 5B:
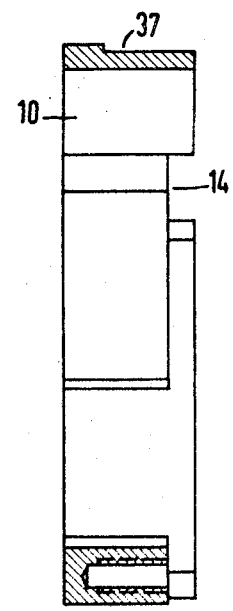
Figure 5C:
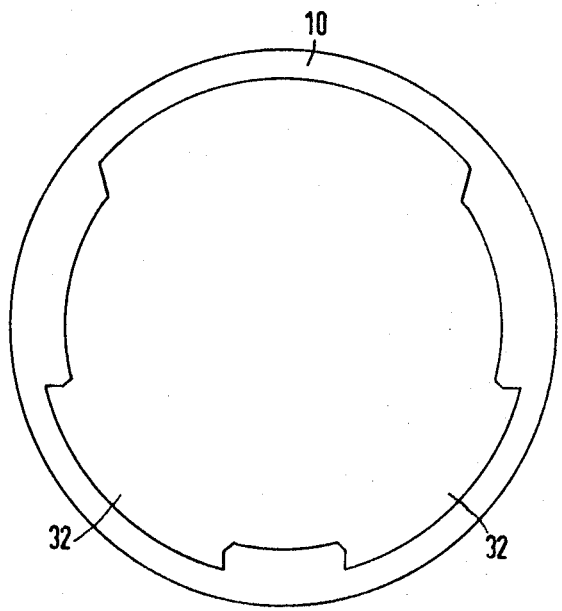

The tubular extension 6 of the coil support 3 has a flange 12 which is formed integral with the molded support structure (FIGS. 1, 3). The flange 12 has radially protruding mounting feet 13 which are anchored in corresponding recesses 14 of the ferromagnetic yoke ring 10 (FIGS. 1 and 5a). Bearing shields 15 and 16 are situated adjacent to the respective yoke components 8 and 10. The bearing shield 15 is fastened by the same metal-forming process to which the can 9 is subjected. The bearing shield 16 is fastened with the aid of screw bolts 17 in threaded engagement with the yoke ring 10. The forming of the metal housing or can 9 is performed preferably with the aid of one of the available high-speed metal-forming processes, preferably the magnetic pulse forming method already mentioned. To secure the bearing shield 15 against rotation, it has a cylindrical portion with recesses 18 into which the can material is pressed by the metal-forming operation. A recess 37 in the yoke ring 10 serves to secure the yoke ring 10 against rotation after the can 9 is subjected to the above-mentioned metal-forming operation.

The flange 12 is provided with a plug-connector base 19 (FIGS. 1a, 2 to 4). If the flange 12 and the coil support 3 are molded from insulating material or from non-magnetic metal, the base 19 may be molded as an integral part of the flange 12. The base 19 is shown to have five slots 20 extending in the radial direction. These are available for the positive latching engagement of inserted connector lugs 21 (FIG. 1a) to which the wires of the stator winding are to be attached by soldering. No insulation of these lugs 21 is necessary if the structure 3, 12 consists of insulating material. Otherwise, a base 19 or respective inserts made of insulating material may be used. The connector base 19 has an arcuate shape and extends through a matching arcuate opening 36 of the bearing shield 16 (FIG. 1a).

FIGS. 6 to 9 illustrate different views of one of the two parts 11 which constitute carriers of the respective Hall probes. The Hall probe 22 with its four terminal leads 24 and 25 is mounted in a recess 26 of the carrier part 11 so as to be protected from damage. The same recess accommodates the ends 27 and 28 of the connector lugs 29 and 30. The terminal leads of the Hall probe are welded or otherwise fusion-bonded to these connector lugs in the recess, as is best apparent from FIG. 6. The connecting wires 29 and 30 are preferably injection-molded or similarly embedded in the carrier part 11 for the Hall probe.

The lateral faces 31 of the carrier 11 do not extend radially but at a somewhat more acute angle relative to each other so that they match corresponding swallow-tail recesses 32 of the yoke ring 10 (FIGS. 1 and 5a). The carrier 11 of the Hall probe forms a nose 33 which engages a corresponding recess 34 (FIGS. 1 and 2) for axially limiting the Hall-probe carrier 11. The carrier 11 has a neck portion which forms a shoulder and extends through a matching opening 36 of the bearing shield, the shoulder then abutting against the bearing shield 16 so that the carrier 11 is positively held in engagement with the above-mentioned recess 32 of the yoke ring 10 and thus prevented from changing its rotational position or its axial position.

The assembling of the motor takes place as follows. The bearing shield 15 and the components 8, 9 and 10 form together a single structural unit since they are all joined together with the aid of the magnetic pulse-forming method mentioned above.

After the permanent-magnet rotor 2 is inserted into the bell-shaped portion 3 of the coil carrier, the disk-shaped cover 5 of the carrier is placed upon the bell, and the four-part stator winding 4 is shoved into place upon the coil carrier. Thereafter, the connector lugs 21 are inserted into the openings 20 of the flange 12 until they catch and remain attached in latched positions. The internal ends of the lugs are then connected by welding or soldering with the respective starting ends and the star point of the winding portions. The circuit of the windings is not illustrated or further described in detail herein because it may fully correspond to the circuitry according to the above-mentioned copending application Ser. No. 634,212.

After thus joining the stator winding with the connector lugs, the motor shaft 1 equipped with the appertaining bearings and inclusive of the parts 2 to 5 is stuck into the housing 10, the feet 13 (FIGS. 1, 3) of the flange 12 then becoming engaged in the recesses 14 (FIG. 5b) of the yoke ring 10. Now, the two probe carrying parts 11 are inserted from the front side of the assembly until they engage into the respective swallow-tail recesses 32 (FIG. 5a) of the yoke ring 10. Thereafter, the assembly is completed by placing the bearing shield onto the front side and fastening it with the aid of the bolts 17.

With the shield 16 fastened in this manner, the carriers 11 with the galvanomagnetic probes are positively secured in the proper position. However, the carriers can be removed and substituted by other carriers and probes after the bolts 17 are loosened and the shield 16 is removed.

It will be understood that the illustrated embodiment relates to a miniature motor in which the permanent-magnet armature has but a single pair of poles, and the stator winding has two pairs of winding portions which correspond to a total of only two galvanomagnetic probes for controlling the commutation of the direct-current applied to the motor windings. The preferred use of Hall probes herein described requires four leads for each individual probe and consequently four connector lugs or pins 29, 30 in each of the two carriers 11. If the rotor is diagonally magnetized to exhibit more than a single pair of magnet poles, the number of stator winding portions must be increased accordingly. On the other hand, when using two-terminal galvanomagnetic devices, such as field plates, only two connections are needed for each galvanomagnetic member so that the number of connector members in each carrier 11 is reduced accordingly. Details of such modifications are not further described herein because in this respect reference may be had to the above-mentioned copending application Ser. No. 782,902 dealing with commutation by field plates.

Upon a study of this disclosure, such and other modifications will be obvious to those skilled in the art, without departing from the essential features of our invention and within the scope of the claims annexed hereto.

We claim:

1. A brushless direct-current motor with galvanomagnetic commutation control means, comprising a motor shaft and a permanent-magnet rotor fixed on said shaft, a stator having a drum-shaped coil support coaxially surrounding said rotor and having stator windings mounted on said support and a magnetizable annular yoke structure surrounding said windings, a ferromagnetic ring coaxially adjacent to said yoke structure so as to form a yoke extension thereof, galvanomagnetic commutation control members responsive to magnetic field effects of said rotor, a carrier assembly situated beside said ring and having base-forming parts to which said galvanomagnetic members are firmly affixed, electric connector members fixed to each of said parts, said ferromagnetic ring having recesses into which said carrier parts are removably inserted with said galvanomagnetic members situated near said ring, and a bearing shield situated in coaxial relation to said ring and having means for journalling said shaft, said bearing shield and said parts of said carrier assembly being in mutual engagement for positively securing said carrier parts in fixed positions, whereby said parts can be removed after removal of said shield.

2. In a motor according to claim 1, said connector members of said carrier parts forming each a connector plug pin as well as a solder-junction lug.

3. In a motor according to claim 1, said recesses of said ferromagnetic ring having a swallow-tail contour, and said respective carrier parts having matingly shaped portions engaging said recesses, 4. In a motor according to claim 1, said bearing shield having openings engaged by said respective carrier parts, said parts having shoulders abutting against said shield to provide for said positive securing engagement, and said connector members comprising pins which extend from said parts and through said shield openings to the exterior of the motor.

5. In a motor according to claim 1, said galvanomagnetic members consisting of two Hall probes angularly spaced from each other and fixedly bonded to two of said carrier parts respectively, said two carrier parts being angularly spaced from each other, and each of said parts having four connector members for connection to the appertaining one Hall probe, said connector members forming respective terminals which extend to the outside of the motor.

6. In a motor according to claim 5, said connector members being injection molded into said carrier parts so as to be rigidly embedded therein, said parts having each a recess adjacent to said ring, and one of said Hall probes being mounted in said recess and having four terminal leads welded to said embedded connector members.

7. A motor according to claim 1, comprising a flange coaxially and integrally joined with said drum-shaped coil support, said flange having radially protruding feet for mounting the motor, a connector bar integral with said flange, and connector members adapted for insertion and latching of connector lugs for said stator winding.

8. In a motor according to claim 7, said flange and each of said carrier parts having respective tongue-and-groove means engaging each other for positively holding said carrier parts in given positions when said bearing shield is attached.

References Cited

UNITED STATES PATENTS

| | | | |
|---|---|---|---|
| 3,204,165 | 8/1965 | Kreutzer | 318—138 |
| 3,230,434 | 1/1966 | Bauerlein | 318—138 |

DAVID X. SLINEY, Primary Examiner

U.S. Cl. X.R.

310—46, 219